(12) United States Patent
Schweng et al.

(10) Patent No.: US 8,723,995 B2
(45) Date of Patent: May 13, 2014

(54) EXTENDED DYNAMIC RANGE IN COLOR IMAGERS

(75) Inventors: Detlef Schweng, Weinstadt-Schnait (DE); Taner Dosluoglu, New York, NY (US); Horst Knoedgen, Munich (DE)

(73) Assignee: Youliza, Gehts B.V. Limited Liability Company, Dover, DE (US)

( * ) Notice: Subject to any disclaimer, the term of this patent is extended or adjusted under 35 U.S.C. 154(b) by 1686 days.

(21) Appl. No.: 10/859,797

(22) Filed: Jun. 3, 2004

(65) Prior Publication Data

US 2005/0248667 A1 Nov. 10, 2005

(30) Foreign Application Priority Data

May 7, 2004 (EP) .................................... 04392024

(51) Int. Cl.
*H04N 9/083* (2006.01)
*H04N 3/14* (2006.01)
*H04N 5/335* (2011.01)
*H04N 9/04* (2006.01)
*H04N 9/07* (2006.01)
*H04N 9/68* (2006.01)

(52) U.S. Cl.
USPC ........... 348/276; 348/277; 348/279; 348/234; 348/260

(58) Field of Classification Search
USPC ................................. 348/234, 260, 270–279
See application file for complete search history.

(56) References Cited

U.S. PATENT DOCUMENTS

| | | | |
|---|---|---|---|
| 4,059,839 A | * | 11/1977 | Yamanaka et al. ............. 348/274 |
| 4,121,244 A | * | 10/1978 | Nakabe et al. ................ 348/276 |
| 4,329,709 A | | 5/1982 | Masuda et al. |
| 4,500,914 A | * | 2/1985 | Watanabe et al. ............. 348/280 |
| 4,516,154 A | * | 5/1985 | Nishizawa et al. ........... 348/275 |
| 4,725,894 A | | 2/1988 | Sasaki et al. |
| 4,939,573 A | * | 7/1990 | Teranishi et al. ............. 348/276 |

(Continued)

FOREIGN PATENT DOCUMENTS

| | | | | |
|---|---|---|---|---|
| EP | 472299 A1 | 7/1991 | ............... | H04N 9/04 |
| EP | 241896 A2 | 9/2002 | ............... | H04N 9/04 |

(Continued)

OTHER PUBLICATIONS

Recommendation ITU-R BT.601-5, Studio Encoding Parameters of Digital Television for Standard 4:3 and Wide-Screen 16:9 Aspect Ratios, 1995.*

(Continued)

*Primary Examiner* — Chia-Wei A Chen
(74) *Attorney, Agent, or Firm* — Stolowitz Ford Cowger LLP

(57) ABSTRACT

A digital color imager providing an extended luminance range, an improved color implementation and enabling a method for an easy transformation into another color space having luminance as a component has been achieved. Key of the invention is the addition of white pixels to red, green and blue pixels. These white pixels have either an extended dynamic rang as described by U.S. patent (U.S. Pat. No. 6,441,852 to Levine et al.) or have a larger size than the red, green, or blue pixels used. The output of said white pixels can be directly used for the luminance values Y of the destination color space. Therefore only the color values and have to be calculated from the RGB values, leading to an easier and faster calculation. As an example chosen by the inventor the conversion to YCbCr color space has been shown in detail.

20 Claims, 3 Drawing Sheets

(56) References Cited

U.S. PATENT DOCUMENTS

| | | | |
|---|---|---|---|
| 5,018,006 A * | 5/1991 | Hashimoto | 348/275 |
| 5,323,233 A * | 6/1994 | Yamagami et al. | 348/277 |
| 5,577,178 A | 11/1996 | Curry et al. | |
| 5,841,422 A | 11/1998 | Shyu | |
| 6,005,682 A * | 12/1999 | Wu et al. | 358/474 |
| 6,235,549 B1 * | 5/2001 | Bawolek et al. | 438/48 |
| 6,441,852 B1 * | 8/2002 | Levine et al. | 348/302 |
| 6,456,325 B1 | 9/2002 | Hayashi | |
| 6,476,865 B1 * | 11/2002 | Gindele et al. | 348/277 |
| 6,486,889 B1 | 11/2002 | Meyers et al. | |
| 6,642,962 B1 | 11/2003 | Lin et al. | 348/252 |
| 6,714,243 B1 * | 3/2004 | Mathur et al. | 348/273 |
| 6,787,824 B2 * | 9/2004 | Takeuchi et al. | 257/258 |
| 6,825,470 B1 * | 11/2004 | Bawolek et al. | 250/339.05 |
| 7,095,441 B2 * | 8/2006 | Nagano | 348/308 |
| 7,126,633 B2 * | 10/2006 | Saito | 348/279 |
| 7,400,332 B2 | 7/2008 | Schweng et al. | |
| 7,414,630 B2 | 8/2008 | Schweng et al. | |
| 7,471,329 B2 * | 12/2008 | Park | 348/350 |
| 7,812,870 B2 | 10/2010 | Utz et al. | |
| 2001/0022363 A1 * | 9/2001 | Nagata et al. | 257/59 |
| 2002/0044209 A1 * | 4/2002 | Saito | 348/280 |
| 2003/0035056 A1 | 2/2003 | Chen et al. | |
| 2003/0197799 A1 * | 10/2003 | Dyas et al. | 348/308 |
| 2004/0012029 A1 * | 1/2004 | Bawolek et al. | 257/98 |
| 2004/0105021 A1 * | 6/2004 | Hu | 348/272 |
| 2006/0268302 A1 | 11/2006 | Chen et al. | |

FOREIGN PATENT DOCUMENTS

| | | | | |
|---|---|---|---|---|
| EP | 1324621 A | 7/2003 | | |
| EP | 1594321 A2 | 11/2005 | | |
| EP | 1608183 A1 | 12/2005 | | |
| JP | 63062492 | 3/1988 | | H04N 9/07 |
| JP | H03234173 A | 10/1991 | | |
| JP | H04267694 A | 9/1992 | | |
| JP | 2003318375 A | 11/2003 | | |
| WO | WO 00/57651 | 9/2000 | | H04N 9/04 |

OTHER PUBLICATIONS

U.S. Patent App. Pub. US2003/0197799 AI to Dyas et al., Pub. Date Oct. 23, 2003, filed Apr. 17, 2002, USCI. 348/308.

U.S. Patent App. Pub. U.S. 2002/0044209 AI to Saito, Pub. Date Apr. 18, 2002, filed Oct. 17, 2001, USCI. 348-280.

U.S. Patent App. Pub. US2002/0101524 AI to Acharya Pub. Date Aug. 1, 2002, filed Dec. 14, 2001, USCI. 348/273.

US Patent App. Pub. US2003/0016295 AI to Nakakuki, Pub. Date Jan. 23, 2003, filed Jul. 12, 2002, USCI. 348/272.

US Patent App. Pub. US 2002/0101524 AI to Acharya, Pub. Date Aug. 1, 2002, filed Dec. 14, 2001, USCI. 348/273.

US Patent App.Pub. US 2002/0012055 AI to Koshiba et al., Pub. Date Jan. 31, 2002, filed Dec. 20, 2000, USCI. 348/273.

US Patent App. Pub. US2003/0197799 AI to Dyas et al., Pub. Date Oct. 23, 2003, filed Apr. 17, 2002, USCI. 348/308.

US Patent App. Pub. US 2002/0044209 AI to Saito, Pub. Date Apr. 18, 2002, filed Oct. 17, 2001, USCI. 348/280.

European Patent Office, European Search Report dated Dec. 8, 2005, for EP App. No. 04392024.8, 5 pages.

* cited by examiner

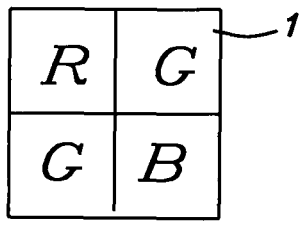
FIG. 1 - Prior Art
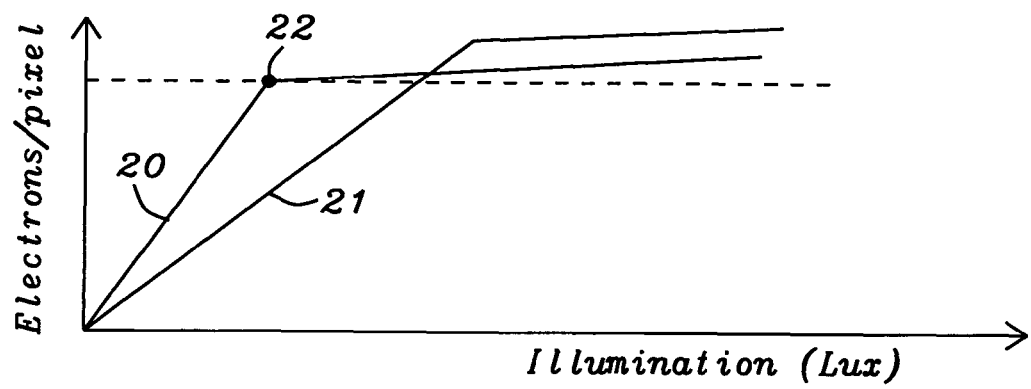
FIG. 2 - Prior Art
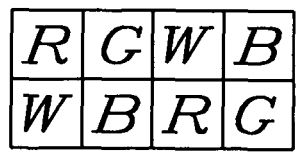
FIG. 3a
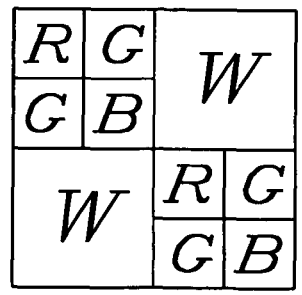
FIG. 3b

EXTENDED DYNAMIC RANGE IN COLOR IMAGERS

BACKGROUND OF THE INVENTION (1) Field of the Invention

This invention relates generally to digital image processing and relates more particularly to a digital color imager and related methods having an improved color representation.

(2) Description of the Prior Art

Color is the perceptual result of light in the visible region of the spectrum, having wavelengths in the region of 400 nm to 700 nm, incident upon the retina. The spectral distribution of light relevant to the human eye is often expressed in 31 components each representing a 10 nm band.

The human retina has three types of color photoreceptors cone cells, which respond to incident radiation with somewhat different spectral response curves. Because there are exactly three types of color photoreceptor, three numerical components are necessary and sufficient to describe a color, providing that appropriate spectral weighting functions are used. These cones provide the "photopic" vision.

Photoreceptors are not distributed evenly throughout the retina. Most cones lie in the fovea, whereas rods dominate peripheral vision. Rods handle the short wavelength light, up to about 510 nm. The number of rods is much higher than the number of cones. They are very sensitive to very low levels of light. These rods provide the "scotopic" vision. There is no color in scotopic vision and it is processed as grayscale.

Since the human eye has more photoreceptors handling black and white compared to colors luminance is more important to vision as colors.

Pixel values in accurate gray-scale images are based upon broadband brightness values. Pixel values in accurate color images are based upon tristimulus values. Color images are sensed and reproduced based upon tristimulus values, whose spectral composition is carefully chosen according to the principles of color science. As their name implies, tristimulus values come in sets of three. In most imaging systems, tristimulus values are subjected to a non-linear transfer function that mimics the lightness response of vision. Most imaging systems use RGB values whose spectral characteristics do not exactly match the tristimulus values of the human eyes.

A combination of real world physical characteristics determines what the human vision system perceives as color. A color space is a mathematical representation of these characteristics. Color spaces are often three-dimensional. There are many possible color space definitions.

Digital cameras have either RGB representation (RGB in one pixel) or Bayer representation, wherein the pixels are arranged as shown in FIG. 1 prior art. In a 2×2 cell 1 are one red (R) pixel, one blue (B) pixel and two green (G) pixels.

Another color space is Hue, Saturation and Luminance (or HSL). In this color space scenes are not described in terms of red, green, and blue, but as hue, saturation, and luminance (HSL). We see things as colors, or hues that either have a washed-out look or have deep, rich tones. This means having low or high saturation, respectively. Hue is the attribute of a visual sensation according to which an area appears to be similar to one of the perceived colors, red, green and blue, or a combination of them. Saturation is the colorfulness of an area judged in proportion to its brightness.

By color saturation control is meant the process to increase or decrease the amount of color in an image without changing the image contrast. When saturation is lowered the amount of white in the colors is increased (washed out). By adjusting the color saturation the same image can be everything from a black and white image to a fully saturated image having strong colors.

Usually different color spaces are being used to describe color images. YUV and YcbCr color spaces are getting more and more important.

The YUV color space is characterized by the luminance (brightness), "Y", being retained separately from the chrominance (color). There is a simple mathematical transformation from RGB: Y is approximately 30% Red, 60% Green, and 10% Blue, the same as the definition of white above. U and V are computed by removing the "brightness" factor from the colors. By definition, U=Blue−Yellow, thus U represents colors from blue (U>0) to yellow (U<0). Likewise V=Red−Yellow, thus V represents colors from magenta (V>0) to Cyan (blue green) (V<0)

The YCbCr color space was developed as part of recommendation CClR601. YCbCr color space is closely related to the YUV space, but with the color coordinates shifted to allow all positive valued coefficients:

$$Cb=(U/2)+0.5$$

$$Cr=(V/1.6)+0.5,$$

wherein the luminance Y is identical to the YUV representation.

U.S. patent (U.S. Pat. No. 6,441,852 to Levine et al.) describes an extended dynamic range imager. An array of pixels provides an output signal for each pixel related to an amount of light captured for each pixel during an integration period. A row of extended dynamic range (XDR) sample and hold circuits having an XDR sample and hold circuit for each column of the array captures an XDR signal related to a difference between the output signal and an XDR clamp level to which the pixel is reset at a predetermined time before the end of the integration period. A row of linear sample and hold circuits having a linear sample and hold circuit for each column of the array captures a linear signal related to a difference between the output signal and an initial output signal to which the pixel is reset at the beginning of the integration period.

FIG. 2 prior art shows a diagram of the relationship between illumination and the yield of electrons per pixel of a "normal" imager 21 and an XDR imager 20. It shows that the resolution of the XDR imager 20 is much higher in low illumination condition than the resolution of "normal" imagers. In case the illumination is higher than the XDR breakpoint 22 the additional yield of electrons is reduced significantly.

XDR enhances the performance especially in low-light conditions. The XDR APS also uses individual pixel addressing to reduce column overload, or "blooming". The excess charge is absorbed in substrate and adjacent pixel drain regions.

It is a challenge for the designers of digital imagers to achieve solutions providing images being almost equivalent to human vision.

There are patents or patent applications related to this area:

U.S. patent (U.S. Pat. No. 6,642,962 to Lin et al.) describes a digital-camera processor receiving mono-color digital pixels from an image sensor. Each mono-color pixel is red, blue, or green. The stream of pixels from the sensor has alternating green and red pixels on odd lines, and blue and green pixels on even lines in a Bayer pattern. Each mono-color pixel is white balanced by multiplying with a gain determined in a previous frame and then stored in a line buffer. A horizontal interpolator receives an array of pixels from the line buffer. The horizontal interpolator generates missing color values by interpolation within horizontal lines in the array. The intermediate results from the horizontal interpolator are stored in a column buffer, and represent one column of pixels from the line buffer. A vertical interpolator generates the final RGB value for the pixel in the middle of the column register by vertical interpolation. The RGB values are converted to YUV. The vertical interpolator also generates green values for pixels above and below the middle pixel. These green values are sent to an edge detector. The edge detector applies a filter to the 3 green values and 6 more green values from the last 2 clock cycles. When an edge is detected, an edge enhancer is activated. The edge enhancer adds a scaled factor to the Y component to sharpen the detected edge. Color enhancement is performed on the U and V components. The line buffer stores only 4 full lines of pixels and no full-frame buffer is needed.

U.S. patent (2003/0016295 to Nakakuki) discloses an invention, making it possible to display an image signal with as a high picture quality as would have been obtained with a solid image pick-up device having color filters arrayed in a mosaic pattern. The image signal obtained from the solid image pick-up device with a Bayer array of the three primary colors of R, G, and B is separated by a color separation circuit into R-color, G-color, and B-color signals. These color signals are attenuated by filters respectively at half a horizontal sampling frequency in order to suppress the occurrence of moire noise. The G-color filter circuit has a narrower attenuation bandwidth than that of the R-color filter circuit and the B-color filter circuit. These color signals thus filtered are adjusted in level at a white balance circuit and then mixed by addition at a mixer, thus generating a luminance signal. By narrowing the attenuation bandwidth of the G-color signal, the resolution can be kept high while suppressing the occurrence of moire noise.

U.S. patent application Publication (U.S. 20020101524 to Acharya) describes an integrated color interpolation and color space conversion technique and apparatus. A raw image that is arranged in a Bayer pattern where each pixel has only one of the color components needed to form a full color resolution pixel may be converted using this technique directly to a YCrCb image space without any intermediate conversion or interpolation steps. Specifically, in one instance, an 8-bit Bayer pattern raw image may be converted directly to a 12-bit YCrCb space in a single step approach. Such an integrated technique may more readily and inexpensively be implemented in hardware such as on a digital camera, or in software.

U.S. patent application Publication (U.S. 2002/0012055 to Koshiba et al.) describes an interpolation for a Bayer pattern color-filtered array with edge enhancement by clamping green interpolation values.

SUMMARY OF THE INVENTION

A principal object of the present invention is to achieve a digital color imager providing an extended luminance range.

Another object of the present invention is to achieve digital color imager providing an improved color and luminance representation.

Another object of the invention is to achieve a method for an easier transformation of the pixel output of a digital color imager into an YcbCr color space.

In accordance with the objects of this invention a digital color imager providing an extended luminance range and an improved color representation comprising red, green, blue and white pixels, wherein said white pixels are extended dynamic range pixels, has been achieved.

In accordance with the objects of this invention a digital color imager has been achieved providing an extended luminance range and an improved color representation comprising red, green, blue and white pixels, wherein said white pixels have a larger size compared to the red, green and blue pixels used.

In accordance with a further object of this invention a method to convert pixel color values of a digital color imager into another color space having luminance as a component has been achieved. Said method comprises, first, providing a digital color imager comprising red, green, blue and white pixels. The steps of the method invented are to use sensor output of white pixel for luminance value Y and to calculate color values of destination color space from the output of the red, green and blue pixels using the correspondent conversion matrix.

In accordance with a further object of this invention a method to convert pixel color values of a digital color imager into YcbCr color space has been achieved. Said method comprises, first, providing a digital color imager comprising red, green, blue and white pixels. The steps of the method invented are to use sensor output of white pixel for luminance value Y and to calculate color values Cb and Cr from the output of the red, green and blue pixels using transformation parameters.

BRIEF DESCRIPTION OF THE DRAWINGS

In the accompanying drawings forming a material part of this description, there is shown:

FIG. 1 prior art shows a Bayer arrangement of red, green and blue pixels.

FIG. 2 prior art describes a diagram of the output of an extended dynamic range pixel as function of the illumination compared to a normal pixel output.

FIGS. 3 a-d illustrate different variations of the addition of white pixels to RGB pixels.

DESCRIPTION OF THE PREFERRED EMBODIMENTS

The preferred embodiments disclose a novel imager and related methods to improve the color representation of digital images by adding white pixels to red, green and blue pixels. These white pixels could have an increased size compared to the red, green and blue pixels used or could be extended dynamic range (XDR) pixels as disclosed in U.S. patent (U.S. Pat. No. 6,441,852 to Levine et al.) issued Aug. 27, 2002.

Figures 3C, 3D:
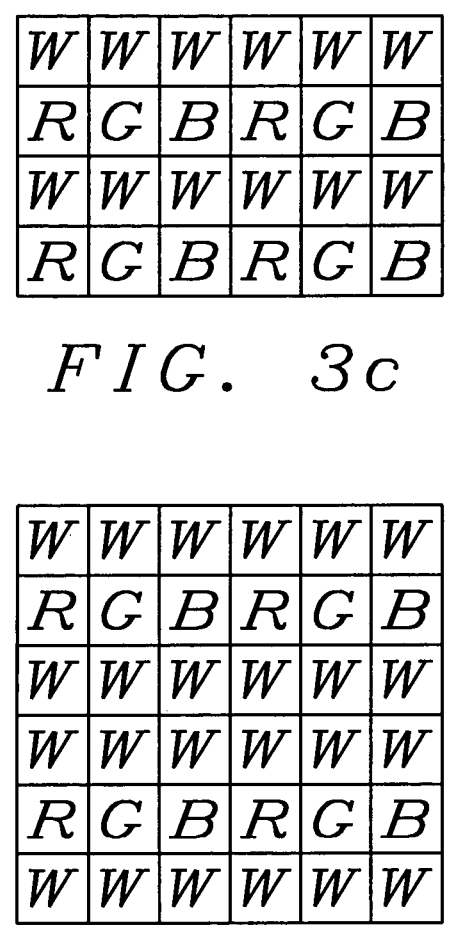

FIG. 3a shows an example of the "extended" Bayer representation as one key point of the present invention. Two white (W) pixels are added to red (R), green (G) and blue (B) pixels. In the example shown only these white (W) pixels are of XDR type providing best resolution and indicating directly luminance values.

FIG. 3b shows another example of an arrangement of an "extended" Bayer representation. Two white (W) pixels, being larger than the other pixels, are added to red (R), green (G) and blue (B) pixels. In the example shown in FIG. 3b these larger white (W) pixels are "normal" pixels, not XDR pixels, providing best resolution and indicating directly luminance values.

Luminance is a component of many color spaces as e.g. YCbCr, YUV, CMYK, HIS, etc. Conversion from RGB to one of those color spaces having luminance as component can be performed by a matrix or vector operation. As example there is a well-known equation to transform pixel data from RGB to YcbCr color space:

$$1[Y\ Cb\ Cr]=[0.299\ 0.587\ 0.114\ -0.169\ -0.331\ 0.5\ 0.5\ -0.418\ -0.081].\text{times}.[R\ G\ B], \quad (1)$$

wherein R, G, B are the values of Red, Green and Blue as components of the RGB color space, and Y is the luminance and Cb and Cr are the color values as components of the YcbCr color space.

Using an "extended" Bayer representation as a key part of the present invention, as shown e.g. in FIG. 3a and in FIG. 3b, the white XDR pixels W shown in FIG. 3a or the white large size pixels W shown in FIG. 3b already yield the luminance value Y of the YcbCr color space. Therefore the transformation from the RGB to YcbCr color space is easier and faster to be calculated. The luminance Y is already provided by the white pixel, the color values Cb and Cr can be calculated according to the following equation:

$$2[Cb\ Cr]=[-0.169\ -0.331\ 0.5\ 0.5\ -0.418\ -0.81].\text{times}.[R\ G\ B], \quad (2)$$

It is obvious that equation (2), shown above, is easier to be calculated compared to equation (1) wherein the value of luminance has to be calculated as well.

It has to be understood that the transformation to an YCbCr color space is just an example, a transformation to other color spaces having luminance as component could be performed in a very similar way.

Figure 4:
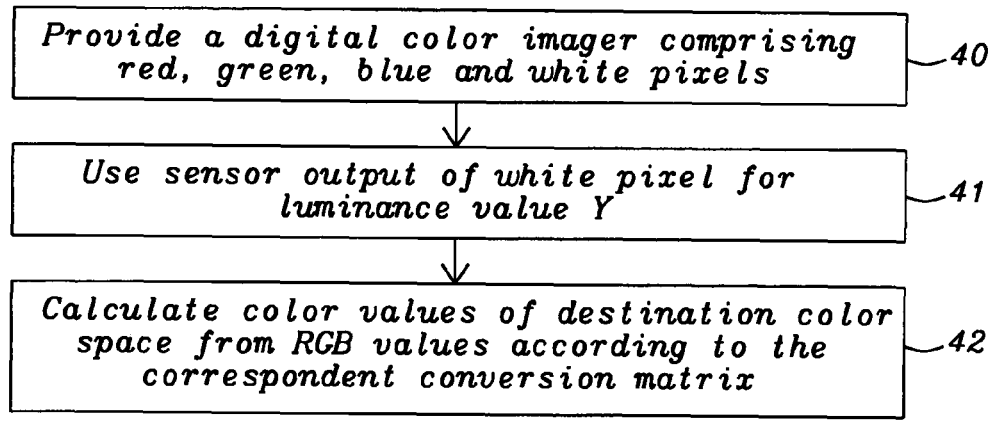
FIG. 4 shows a flowchart of a method to convert the output of red, green, blue and white pixels into another color space having luminance as a component.

FIG. 4 describes a method how to convert the RGB values of an imager of the present invention comprising red, green, blue and white pixels into another color space having luminance as a component, such as e.g. YIQ, YUV, CMYK. Step 40 describes the provision of red, green, blue and white pixels in a digital color imager. Said white pixels could be either pixels of the XDR type having a similar size as the red, green or blue pixels being used in the digital imager could be of a non-XDR type being larger than said red, green and green pixels. Step 41 shows that the output of these white pixels can be used directly for the luminance value Y of the YcbCr color space. In step 42 the color values of the destination color space are calculated from the red, green and blue pixel values according to the correspondent conversion matrix.

Figure 5:
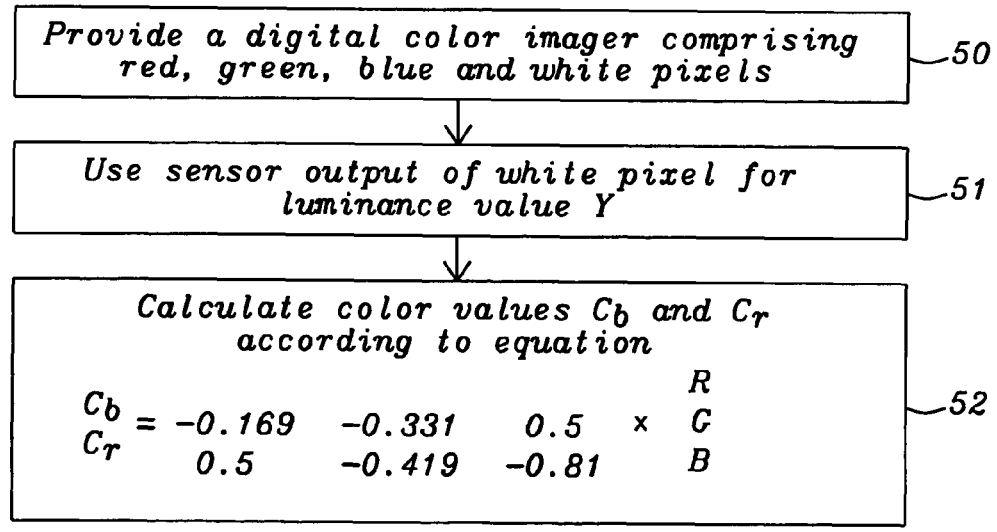
FIG. 5 shows a flowchart of a method to convert the output of red, green, blue and white pixels into YCbCr color space.

FIG. 5 describes as a chosen example a method how to convert the RGB values of an imager of the present invention comprising red, green, blue and white pixels into an YcbCr color space. Step 50 describes the provision of red, green, blue and white pixels in a digital color imager. Said white pixels could be either pixels of the XDR type having a similar size as the red, green or blue pixels being used in the digital imager could be of a non-XDR type being larger than said red, green and green pixels. Step 51 shows that the output of these white pixels can be used directly for the luminance value Y of the YcbCr color space. In step 52 the color values Cb and Cr are calculated from the red, green and blue pixel values according to equation (2).

There are unlimited variations possible a layout of an "extended" Bayer representation. FIGS. 3a, 3b, 3c and 3d show just a few examples of a multitude of possible arrangements of Red (R), Blue (B), Green (G), and Black/White (W) pixels. The white pixels shown in FIGS. 3c and 3d could represent either pixels of the XDR type having a similar size as the red, green or blue pixels used in a digital color imager or non-XDR type pixels being larger than said red, green or blue pixels. A key point of the invention is to combine white pixels, being either from XDR-type or of larger size, with red, green and blue pixels. Due to the extended dynamic range of the Black/White (W) pixels or due to the extended size there is an extended range for luminance generated. The pixels are converted to RGB or YCbCr representation or to some other color space by interpolation.

There is a tradeoff between the percentage of white pixels compared to the share of RBG pixels in regard of a high color resolution and a signal-to-noise (SNR) in luminance to be considered. The more white pixels are being used the higher is the SNR in luminance. The more RGB pixels are being used the more color representation is provided.

Alternatively only the R, G, B pixels shown in FIGS. 3a to 3d could be provided with filters of the respective colors while the white pixels would have no filters. By this measure a common kind of sensors could be deployed a cross the imager.

In summary, the advantages of the present invention are to achieve an extended luminance range, a correct color representation and an easy digital post-processing in YCbCr representation by introducing white pixels having either an extended dynamic range (XDR) or a larger size than the RGB pixels used in the digital color imager.

While the invention has been particularly shown and described with reference to the preferred embodiments thereof, it will be understood by those skilled in the art that various changes in form and details may be made without departing from the spirit and scope of the invention.

What is claimed is:

1. A digital color imager comprising:
an image sensor array including red, green, blue and white pixel sensors, wherein the white pixel sensors are sensitive to broadband brightness values, and wherein pixels associated with the white pixel sensors each have a larger light exposure surface area than pixels associated with the red, green and blue pixel sensors.

2. The digital color imager of claim 1, wherein the red, green and blue pixel sensors have corresponding color filters.

3. The digital color imager of claim 1, wherein the white pixel sensors have an extended dynamic range and wherein the red, green and blue pixel sensors have a non-extended dynamic range.

4. The digital color imager of claim 1, wherein the image sensor array is arranged in groups of quadrants.

5. The digital color imager of claim 4, wherein a first quadrant comprises a first group of red, green, and blue pixel sensors, wherein a second quadrant comprises a first single white pixel sensor, wherein a third quadrant comprises a second single white pixel sensor, and wherein a fourth quadrant comprises a second group of red, green, and blue pixel sensors.

6. The digital color imager of claim 5, wherein the first quadrant is located adjacent both the second quadrant and the third quadrant, and wherein the fourth quadrant is also located adjacent both the second quadrant and the third quadrant.

7. The digital color imager of claim 4, wherein the image sensor array comprises a first quadrant including red, green, and blue pixel sensors and a second quadrant including a single white pixel sensor, and wherein the first quadrant and the second quadrant are arranged in the groups of quadrants in a staggered manner.

8. The digital color imager of claim 4, wherein the image sensor array comprises a first quadrant including red, green, and blue pixel sensors and a second quadrant including a single white pixel sensor, and wherein each of the groups of quadrants includes alternating placement of the first quadrant and the second quadrant.

9. The digital color imager of claim 4, wherein a first quadrant comprises red, green, and blue pixel sensors, and wherein a second quadrant comprises a white pixel sensor.

10. The digital color imager of claim 9, wherein the first quadrant comprises one red pixel, two green pixels, and one blue pixel.

11. A method to convert pixel color values of a digital color imager into another color space having luminance as a component, the method comprising:
sensing, with the digital color imager, light corresponding to an image, wherein the digital color imager comprises red, green, blue and white pixel sensors, wherein the white pixel sensors are sensitive to broadband brightness values, and wherein pixels associated with the white pixel sensors each have a larger light exposure surface area than pixels associated with the red, green and blue pixel sensors;
using, with the digital color imager, an output of the white pixel sensors for a luminance value Y of the another color space; and
calculating, with the digital color imager, color values of the another color space from an output of the red, green and blue pixel sensors using a corresponding conversion matrix.

12. The method of claim 11, wherein the white pixel sensors have an extended dynamic range and wherein the red, green and blue pixel sensors have a non-extended dynamic range.

13. The method of claim 11, wherein the pixel color values of the digital color imager are converted into a YCbCr color space, and wherein said calculating comprises:
calculating, with the digital color imager, color values Cb and Cr from the output of the red, green and blue pixel sensors.

14. The method of claim 13, wherein said calculating of the Cb and Cr components of the YCbCr color space is performed according to the following equation:

$$\begin{bmatrix} Cb \\ Cr \end{bmatrix} = \begin{bmatrix} -0.169 & -0.331 & 0.5 \\ 0.5 & -0.419 & -0.81 \end{bmatrix} \times \begin{bmatrix} R \\ G \\ B \end{bmatrix},$$

15. A digital color image sensor array comprising:
a first sensor row including a first set of contiguous white pixel sensors;
a second sensor row including alternating red, green, and blue pixel sensors; and
a third sensor row including a second set of contiguous white pixel sensors, wherein the second sensor row is located between the first sensor row and the third sensor row, and
wherein pixels associated with the first set of contiguous white pixel sensors and pixels associated with the second set of contiguous white pixel sensors each have a larger light exposure surface area than pixels associated with the red, green and blue pixel sensors.

16. The digital color image sensor array of claim 15, wherein both the first sensor row and the third sensor row are located adjacent to the second sensor row.

17. The digital color image sensor array of claim 16, further comprising a fourth sensor row including alternating red, green, and blue pixel sensors, wherein the fourth sensor row is located adjacent the third sensor row.

18. The digital color image sensor array of claim 16, further comprising a fourth sensor row including a third set of contiguous white pixel sensors, wherein the fourth sensor row is located adjacent the third sensor row.

19. The digital color image sensor array of claim 18, further comprising a fifth sensor row including alternating red, green, and blue pixel sensors, wherein the fifth sensor row is located adjacent the fourth sensor row.

20. The digital color image sensor array of claim 16, wherein a plurality of rows of sensors are arranged as rows of contiguous white pixel sensors alternately positioned with rows of alternating red, green, and blue pixel sensors.

* * * * *